Oct. 15, 1963
H. A. TIMMONS
3,106,949
AUTOMOBILE TIRE CHAINS
Filed Sept. 17, 1962
2 Sheets-Sheet 2
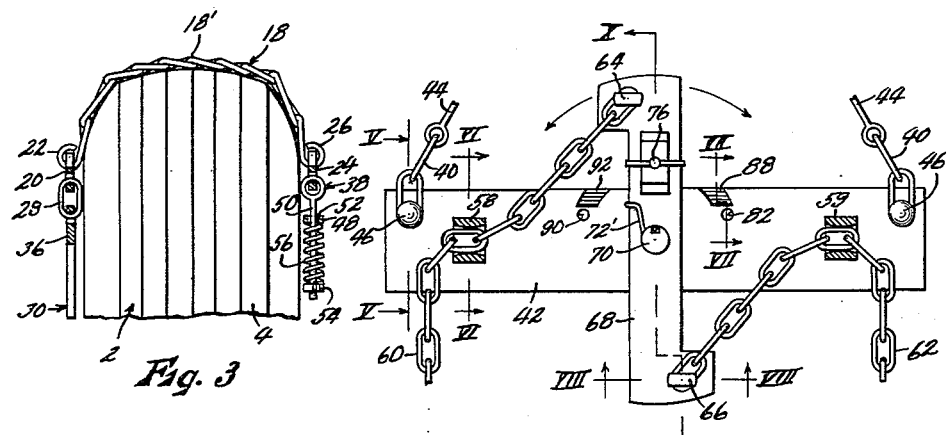
Fig. 3  Fig. 4
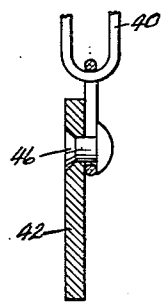
Fig. 5
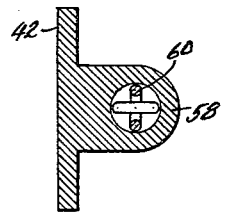
Fig. 6
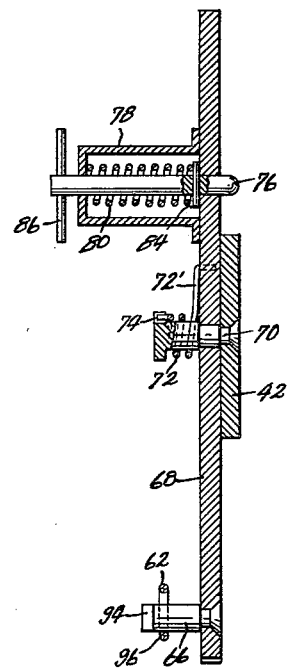
Fig. 10
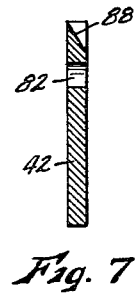
Fig. 7
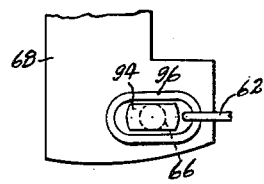
Fig. 8
Fig. 9
INVENTOR.
Henry A. Timmons
BY John A. Hamilton
Attorney.

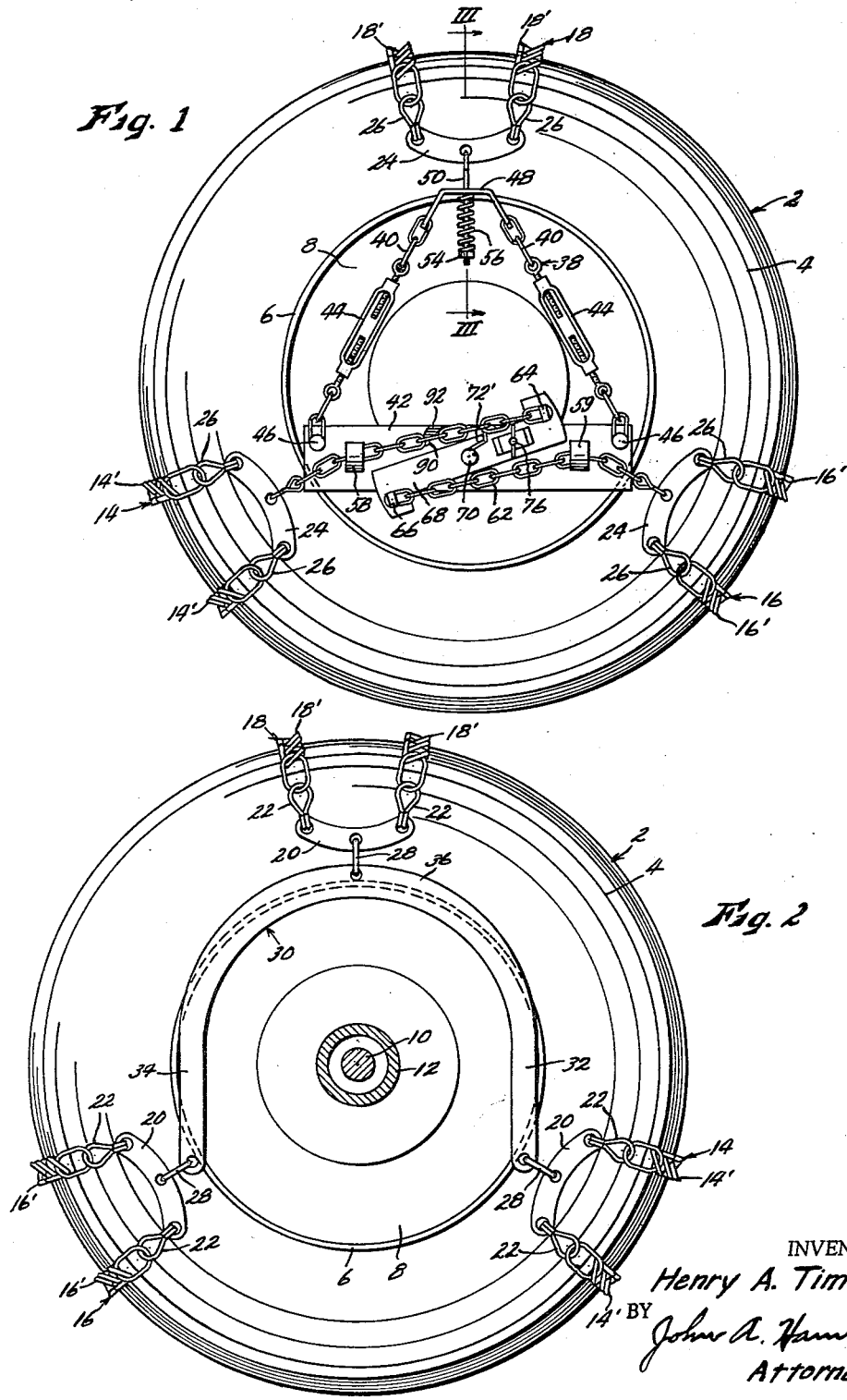

United States Patent Office 3,106,949
Patented Oct. 15, 1963

3,106,949
AUTOMOBILE TIRE CHAINS
Henry A. Timmons, 5540 Lathrop, Kansas City, Kans.
Filed Sept. 17, 1962, Ser. No. 224,151
9 Claims. (Cl. 152—218)

This invention relates to new and useful improvements in anti-skid devices for automobiles, and relates particularly to that class of anti-skid devices commonly known as tire chains.

Among the principal objects of the present invention are the provision of a set of tire chains which may be applied quickly and easily by a single person, without necessity of jacking up the car or rolling it onto the chains, and without necessity of access to the inner face of the wheel for making connections of chain ends or for any other purpose. The latter is an advantage in that the operator need not soil his clothing by lying on the ground or reaching behind the wheel. The chains of the present invention are removable with equal ease and facility.

Other objects are simplicity and economy of construction, efficiency and dependability of operation, the provision of tire chains which will remain tight and snug despite compression of the tire as the automobile moves, and the provision of tire chains which are readily adjustable to fit wheels of different sizes.

With these objects in view, as well as other objects which will appear in the course of the specification, reference will be had to the accompanying drawing, wherein:

FIG. 1 is a side elevational view of the outer face of the rear wheel of an automobile, with a set of tire chains embodying the present invention applied operatively thereto, FIG. 2 is an elevational view of the inner face of the automobile wheel shown in FIG. 1, with parts shown in section, FIG. 3 is a fragmentary sectional view taken on line III—III of FIG. 1, FIG. 4 is an enlarged fragmentary view similar to FIG. 1, showing the lock bar in a position intermediate its locked and unlocked positions, FIG. 5 is an enlarged fragmentary sectional view taken on line V—V of FIG. 4, FIG. 6 is an enlarged sectional view taken on line VI—VI of FIG. 4.

FIG. 7 is an enlarged sectional view taken on line VII—VII of FIG. 4,

FIG. 8 is an enlarged sectional view taken on line VIII—VIII of FIG. 4,

FIG. 9 is an elevational view of one end portion of the lock bar, with the associated connector chain positioned for detachment therefrom, and FIG. 10 is an enlarged sectional view taken on line X—X of FIG. 4, with parts left in elevation.

Like numerals apply to similar parts throughout the several views, and the numeral 2 applies generally to an automobile wheel including a tire 4 mounted on a rim 6 having a wheel disc 8 mounted on an axle 10 enclosed in an axle housing 12 (see FIG. 2).

The tire chains forming the subject matter of the present invention include three sets of tread chains 14, 16 and 18 which are adapted to extend transversely across the tread of tire 4 to provide added traction for said tire against mud, snow, ice or the like in the usual manner. The specific design of the links of these tread chains is not pertinent to the present invention. Each of these sets of tread chains, as shown, includes a pair of chains 14', 16', and 18', respectively, although each set could consist of a greater or smaller number of individual chains, if desired. As best shown in FIG. 2, the ends of each pair of tread chains at the inner face of wheel 2 are connected respectively to the opposite ends of a crescent-shaped connector plate 20, by means of an end link 22, and the ends of each pair of the tread chains at the outer face of the wheel are connected respectively to the opposite ends of a crescent-shaped connector plate 24, by means of an end link 26. The three sets of tread chains 14, 16 and 18 are disposed at substantially equal angular intervals about the wheel, or at angles of 120 degrees to each other, as clearly shown in FIGS. 1 and 2.

Each of connector plates 20 at the inner face of the wheel has a link 28 connected in the central portion thereof, and links 28 are all connected to an inner frame 30. As best shown in FIGS. 2 and 3, inner frame 30 is rigid and formed of plate stock, being of generally U-shape, having a pair of parallel side arms 32 and 34 connected by a curved base portion 36. Links 28 associated with tread chains 14 and 16 are connected respectively to the free ends of legs 32 and 34 of inner frame 30, and link 28 associated with tread chains 18 is connected to the center of base portion 36 of the frame. Frame 30, as best shown in FIG. 2, is in use disposed substantially flat against the inner face of wheel 2, in bridging relation to axle housing 12, and with links 28 substantially equidistant from the axle 10.

An outer frame 38, corresponding to inner frame 30, is adapted to lie substantially flat against the outer face of wheel 2, as best shown in FIG. 1. Said outer frame is substantially triangular, consisting of a pair of chain legs 40 and a rigid leg 42 consisting of a flat steel plate disposed in the plane of the frame. Each of the chain legs 40 has a screw turnbuckle 44 inserted therein to adjust the length thereof. One end of each chain leg 40 is affixed to rigid leg 42, respectively at opposite ends thereof, as by a rivet 46. The opposite ends of said chain legs are connected respectively to the opposite ends of an angled corner bracket 48. An eye bolt 50 has the eye thereof secured centrally in the connector plate 24 associated with tread chains 18, and extends slidably through a hole 52 (see FIG. 3) provided therefor in corner bracket 48, having a nut 54 threaded on the extended end thereof. A helical compression spring 56 is disposed on said bolt and compressed between said bracket and said nut. Affixed to rigid leg 42, respectively adjacent opposite ends thereof, are a pair of keeper eyes 58 and 59, which open longitudinally of leg 42.

It will be seen that rigid leg 42 extends generally between connector plates 24 associated with tread chains 14 and 16. A pair of connector chains 60 and 62 are attached respectively to the mid-points of connector plates 24 associated with tread chains 14 and 16, and each of said connector chains is threaded slidably through the keeper eye 58 or 59 at the associated end of leg 42. The opposite ends of chains 60 and 62 are attached respectively to a pair of studs 64 and 66 which are in turn fixed respectively in the opposite end portions of an elongated lock bar 68. Said lock bar is pivoted at its mid-point to the mid-point of frame leg 42, as by a rivet 70.

When lock bar 68 is pivoted to the position shown in FIG. 1, with stud 64 adjacent eye 59 and stud 66 adjacent eye 58, connector chains 60 and 62 are drawn into overlapping relation as shown, and the tread chains are thereby drawn into snug engagement with the tire tread. This is the "locked" position of the lock bar, and the lock bar is resiliently biased toward this position by a torsion spring 72 mounted on rivet 70 and, as best shown in FIG. 10, having one end secured in a notch 74 of the rivet head and its opposite end extended to form an arm 72' engaging an edge of lock bar 68. Also, the lock bar is releaseably secured in its locked position by a latch pin 76 mounted slidably in a bracket 78 (see FIG. 10) affixed to the lock bar, and urged by a spring 80 to enter a hole 82 (see FIG. 4) formed in rigid frame leg 42. A transverse pin 84 inserted in pin 76 limits the extension of the latch pin by the spring, and the latch pin is provided with a cross-head 86 by means of which it may be manually retracted against the spring. The operating end of the latch pin is rounded, and the edge of rigid leg 42 adjacent hole 82 is bevelled as indicated at 88, to facilitate entry of the pin in the hole.

Lock bar 68 may also be pivoted to a substantially reversed position with respect to frame leg 42, against the pressure to torsion spring 72, that is, to bring stud 64 adjacent eye 58, and stud 66 adjacent eye 59. This is the "unlocked" position of the lock bar, and causes connector chains 60 and 62 to be payed out through keeper eyes 58 and 59, thereby slackening the tread chains sufficiently to permit application and removal of the device to and from the automobile wheel, as will presently be described. The lock bar is releasably secured in this unlocked position by the entry of latch pin 76 in a hole 90 formed in rigid frame leg 42, the edge of said leg also being bevelled adjacent hole 90, as indicated at 92.

For reasons which will also presently be discussed, it is desirable that connector chains 60 and 62 be quickly and easily detachable from studs 64 and 66. For this reason, as shown in FIGS. 8-10 referring to chain 62 and stud 66, each stud is provided with a rectangular head 94 and each chain is provided with an end link 96 having a substantially rectangular opening, the proportions of these parts being such that the end link may pass over the head only when the opening is longitudinally aligned with the major axis of the head, as shown in FIG. 9. The heads 94 extend transversely to the major axis of the lock bar, so that accidental disengagement of the chains from the studs cannot occur when the lock bar is in its locked position.

To apply the chains to wheel 2, lock bar 68 is first secured in its unlocked position by engaging latch pin 76 in hole 90. Inner frame 30 is then held in an inverted position adjacent the outer face of wheel 2, with the curved base portion 36 thereof extending above the top of tire 4. Frame 30 is then moved to one side or the other until one parallel arm thereof, say arm 32, extends outwardly at one side of the wheel, and said arm is then moved to the inner side of the wheel. This may be done while grasping only the other arm 34 of the frame, and carries the inner ends of tread chains 14 to the inner face of the wheel. Frame 30 is then "combed" over the wheel, that is, moved horizontally toward the opposite side of the wheel with frame arm 32 at the inner face of the wheel and frame arm 34 at the outer face of the wheel, until frame arm 34 can also be flipped to the inner face of the wheel. This carries the inner ends of tread chains 16 and 18 to the inner face of the wheel. During the "combing" operation, no interference will occur between the free end of arm 32 and axle housing 12. Then by manipulating tread chains 18, inner frame 30 is properly centered with respect to the wheel. Outer frame 38 will then be properly disposed at the outer face of the wheel, but tread chains 14 and 16 will be hanging loosely. Lock bar 68 is then released from its unlocked position by pulling outwardly on latch pin 76 to free it from hole 90, and is urged pivotally toward its locked position by torsion spring 72. This draws connector chains 60 and 62 inwardly through keeper eyes 58 and 59, and draws tread chains 14 and 16 into snug engagement with the tire tread. The final portion of the movement of lock bar toward its locked position, in which latch pin 76 engages in hole 82, will probably require manual assistance, since at this time the tensioning spring 56 is compressed. The tire chains are then completely applied.

Tensioning spring 56 serves to keep the tread chains snugly in engagement with the tire tread even when those portions of the tire directly engaged by the tread chains are compressed and deformed by contact with the ground. This eliminates objectionable rattling and improves operating efficiency of the device. The proper degree of tensioning of spring 56 may be obtained by adjusting turnbuckles 44. It will be apparent also that adjustment of turnbuckles 44 will adapt the device for use on tires of different diameters and thicknesses. It will be seen that the chains are applied quickly and easily by one person without assistance, and without necessity of jacking the wheel up, rolling the car onto the chains, or reaching to the inner face of the wheel.

The device may also be quickly and easily removed from the wheel, provided only that the car does not come to rest with the tread chains gripped directly between the tire and the ground. If that portion of the tire between tread chains 14 and 16 engages the ground, the device may be removed simply by reversing the application procedure as described above. However, if the portions of the tire between tread chains 14 and 18, or between chains 16 and 18, rest on the ground, difficulties might arise if it were not for the detachability of connector chains 60 and 62 from studs 64 and 66. For example, if the portion of the tire between tread chains 16 and 18 rested on the ground, and if the removal procedure were performed to the extent that the entire device rested on the ground, the tire would still be disposed in an endless loop consisting, in sequence, of outer frame 38, tread chains 18, inner frame 30, tread chains 16, and connector chain 62. In this case, chain 62 is simply disconnected from stud 66, as previously described, to break the loop, and removal may then be completed.

While I have shown and described a specific embodiment of my invention, it will be readily apparent that many minor changes of structure and operation could be made without departing from the spirit of the invention as defined by the scope of the appended claims.

What I claim as new and desire to protect by Letters Patent is:

1. Anti-skid chains for an automobile wheel comprising:
   (a) a planar, substantially U-shaped inner frame adapted to lie flat against the inner face of said wheel in bridging relationship to the axle thereof,
   (b) three sets of tread chains adapted to traverse the tire tread of said wheel at substantially equally spaced angular intervals,
   (c) means connecting the inner ends of each of said sets of tread chains to said inner frame, the first and second of said sets being connected to the free ends of said inner frame and the third set being connected to the mid-portion of said frame,
   (d) a substantially planar outer frame adapted to lie flat against the outer face of said wheel and comprising three legs connected in substantially triangular form at least one of said legs being rigid, the third of said sets of tread chains being connected to the apex of said triangular frame opposite said rigid leg,
   (e) a keeper eye affixed to said rigid frame leg adjacent each end thereof,
   (f) a lock bar pivoted intermediate its ends to an intermediate point of said rigid frame leg on an axis normal to the plane of said frame, so as to be longitudinally reversible with respect to said rigid frame leg, and
   (g) a pair of connector chains each secured at one end to the outer end of one of said first and second sets of tread chains and being threaded through the keeper eye at the corresponding end of said rigid frame leg, the opposite ends of said connector chains being secured respectively to the opposite ends of said lock bar, said lock bar being pivotally movable to a locked position wherein it extends longitudinally of said rigid frame leg with said connector chains overlapping longitudinally thereof, and wherein said tread chains are drawn tightly against said tire tread, or to an unlocked position in which said tread chains are sufficiently slack to permit removal thereof from said wheel.

2. The structure as defined in claim 1 with the addition of:
   (a) a latch carried by said lock bar and operable to engage said rigid frame leg to secure said lock bar releasably in its locked position.

3. The structure as defined in claim 1 with the addition of:
   (a) a latch carried by said lock bar and operable to engage said rigid frame leg to secure said lock bar releasably in its locked position, and
   (b) resilient means biasing said lock bar toward its locked position.

4. The structure as defined in claim 1 with the addition of:
   (a) a latch carried by said lock bar and operable to engage said rigid frame leg to secure said lock bar selectively in either its locked or its unlocked position.

5. The structure as defined in claim 1 with the addition of:
   (a) a latch carried by said lock bar and operable to engage said rigid frame leg to secure said lock bar selectively in either its locked or its unlocked position, and
   (b) resilient means biasing said lock bar toward its locked position.

6. The structure as defined in claim 1 wherein each of said connector chains is connected to said lock bar by means permitting quick detachment thereof.

7. The structure as defined in claim 1 wherein each of said connector chains is connected to said lock bar by means including:
   (a) an end link of said chain having spaced apart parallel side bars providing a rectangular opening, and
   (b) a stud fixed in said lock bar and extending through said end link, said stud having a rectangular head, said head being adapted to pass through said link opening only when the longitudinal axes of said head and said opening coincide.

8. The structure as defined in claim 1 wherein the two legs of said outer frame other than said rigid leg are adjustable in length.

9. The structure as defined in claim 1 wherein said third set of tread chains is connected to said outer frame by means including a resiliently extensible member.

References Cited in the file of this patent
UNITED STATES PATENTS

| | | |
|---|---|---|
| 2,639,753 | Pike | May 26, 1953 |
| 2,711,770 | Conoscente et al. | June 28, 1955 |
| 2,970,632 | Kug | Feb. 7, 1961 |
| 3,025,900 | Brown et al. | Mar. 20, 1962 |